United States Patent Office 3,537,882
Patented Nov. 3, 1970

3,537,882
SILICIC HYDROCARBON COMPOSITES
John Bentley Wiggill, Wilmington, Del., assignor to E. I. du Pont de Nemours and Company, Wilmington, Del., a corporation of Delaware
No Drawing. Continuation-in-part of application Ser. No. 483,835, Aug. 30, 1965, which is a continuation-in-part of application Ser. No. 377,064, June 22, 1964, which in turn is a continuation-in-part of application Ser. No. 441,357, Mar. 19, 1965. This application Aug. 31, 1967, Ser. No. 664,631
The portion of the term of the patent subsequent to Feb. 11, 1986, has been disclaimed
Int. Cl. C03c 17/30, 25/02; B32b 17/04
U.S. Cl. 117—72                    9 Claims

ABSTRACT OF THE DISCLOSURE

Composites comprising hydrocarbon polymers bonded to a silicic substrate through a copolymer containing polymerized ethylene units and units containing a hydrolyzable silane group, where the silane containing units are cross linked through Si—O—Si linkages to form a network.

---

This application is a continuation-in-part of U.S. patent application Ser. No. 483,835, filed Aug. 30, 1965; Ser. No. 377,064, filed June 22, 1964, now Pat. 3,427,187; and Ser. No. 441,357, filed Mar. 19, 1965, now Pat. 3,408,420, which applications are continuations-in-part of application Ser. No. 363,973, filed Apr. 30, 1964, now abandoned. This invention relates to silane-modified alpha-olefin containing copolymers bonded to substrates.

It is known in the art to produce copolymers of alpha-olefins and alpha-beta-ethylenically unsaturated carboxylic acids, such as ethylene-methacrylic acid copolymers. It is further known in the art to modify these copolymers by reaction of the carboxylic acid groups; for example, ethylene-methacrylyl halide copolymers have been produced by reacting an ethylene-methacrylic acid copolymer with a halogenating compound. The present invention is concerned with modification of these copolymers by reacting the copolymer with a silane compound, as hereinafter defined, the subsequent coating of the silane containing copolymer onto various substrates, especially metal, metal oxide and silicic substrates, and the incorporation of these coated substrates into hydrocarbon polymers.

Suitable copolymers for use as starting materials for the production of the copolymers for use in the composites of this invention comprise ethylene units and at least one alpha-beta-ethylenically unsaturated carboxylic acid unit having one to two carboxylic acid groups. Preferably, the alpha-beta-ethylenically unsaturated carboxylic acid unit has 3 to 8 carbon atoms. The concentration of the ethylene unit in the copolymer is at least 50 mol percent and preferably greater than 80 mol percent. The concentration of the alpha-beta-ethylenically unsaturated carboxylic acid unit in the copolymer is 0.2 mol percent to 25 mol percent, preferably from 1 to 10 percent. Specific alpha-beta-ethylenically unsaturated carboxylic acid units useful in the copolymers include: acrylic, methacrylic, ethacrylic, itaconic, maleic, fumaric, monoesters of dicarboxylic acid such as ethyl hydrogen fumarate, and maleic anhydride. Maleic anhydride and other mono-alpha-beta-ethylenically unsaturated anhydrides are considered acids for the purposes of the present invention.

The preferred process for preparing the acid copolymers for use in the present invention is direct copolymerization. This may be achieved by introducing the monomers into a polymerization environment maintained at high pressures, 50 to 3000 atmospheres, and at elevated temperature, 150° C. to 300° C., together with a free radical polymerization catalyst. An inert solvent such as benzene may be employed in the polymerization environment. Random distribution of carboxylic acid groups in all the polymer molecules is best obtained by direct copolymerization. Particular processes for the production of the copolymers are known in the art and described in the literature.

The copolymers may also be obtained by grafting an alpha-beta-ethylenically unsaturated carboxylic acid to a polyethylene base, or by conversion of a copolymer of a polyethylene and a derivative of carboxylic acid to the free acid.

The copolymers are preferably of high molecular weight. Molecular weight is suitably defined by melt index, a measure of viscosity described in detail in ASTM–D–1238–57T. The melt index of the copolymers preferred in the present invention is within the range of 0.1 to 1000 g./10 min.

The acid copolymer need not be a two component polymer. Thus, although the ethylene content of the copolymer should be at least 50 mol percent, more than one alpha-beta-ethylenically unsaturated carboxylic acid may be employed. Additionally, any third copolymerizable monomer can be employed in combination with the ethylene and the carboxylic acid comonomer. Preferred termonomers are vinyl esters and acrylates, i.e., alkyl acrylates and methacrylates having up to eight carbon atoms, vinyl acetate, vinyl propionate, methyl methacrylate and ethyl acrylate. These termonomers are preferably present to the extent of 0.1 to 25 mol percent based on the total mols polymerized. The scope of acid copolymers suitable for use in the present invention is illustrated by the following examples:

Ethylene/acrylic acid copolymers, ethylene/methacrylic acid copolymers, ethylene/itaconic acid copolymers, ethylene/methyl hydrogen maleate copolymers, ethylene/maleic acid copolymers, ethylene/acrylic acid/methyl methacrylate copolymers, ethylene/methacrylic acid/methyl methacrylate copolymers, ethylene/itaconic acid/methyl methacrylate copolymers, ethylene/methyl hydrogen maleate/ethyl acrylate copolymers, ethylene/methacrylic acid/vinyl acetate copolymers, ethylene/acrylic acid/vinyl alcohol copolymers, ethylene/propylene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, ethylene/vinyl fluoride/methacrylic acid copolymers, ethylene/chlorotrifluoroethylene/methacrylic acid copolymers, ethylene/methacrylic acid/acrylic acid copolymers, and ethylene/methacrylic acid/maleic anhydride copolymers.

The copolymer containing the silane group may be prepared directly from the acid copolymer or by first converting the acid copolymer to an acyl halide copolymer.

The ethylene/alpha-beta-ethylenically unsaturated carboxylic acid copolymers are converted to acid halide copolymers by treating with a suitable halogenating agent. Such agents include carbonyl chloride, thionyl chloride, phosphorus trichloride and phosphorus pentachloride, and the equivalent bromine and iodine compounds. The halogen substitution step may be carried out in an organic solvent for the copolymer, preferably a halogenated solvent. The solvent should be liquid under reaction conditions, and contain between 1 and 12 carbon atoms. Suitable solvents include carbon tetrachloride, perchloroethylene, trichloroethylene, toluene, benzene, and xylene. The reaction may also be carried out in the absence of a solvent using solid polymer and thionyl chloride vapor as the halogenating agent. A more complete description of processes for producing such copolymers is contained in Ser. No. 254,567, filed Jan. 29, 1963. Preferably, substantially all of the acid groups are converted to acid halide groups.

The conversion of the copolymers containing alpha-olefin units and alpha-beta-ethylenically unsaturated acid, acyl halide units, to silane containing copolymers is preferably carried out by dissolving the polymer in a suitable solvent and adding the silane compound to the solution. Suitable solvents include hydrocarbon solvents and chlorinated hydrocarbon solvents such as benzene, toluene, xylene, hexane, cyclohexane, carbontetrachloride, tetrachloroethylene, trichloroethylene, and the like. In the case of the acyl halide copolymers the silane compound can be made to react substantially stoichiometrically with the halide atoms of the copolymer. Thus, the amount of conversion of halide to the silane derivative can be regulated by merely regulating the amount of silane compound added. The conversion is usually carried out at a temperature between 25 and 200°C.; the temperature is not critical.

In general, it is desirable to have a sufficient number of silane radicals present in the copolymer to crosslink the copolymer and form a network. A network could be accomplished with as few as two silane radicals per copolymer molecule. Stated in terms of mol percent, the number of silane radicals necessary to form a network is about 0.1 percent based on the copolymer. The silane radicals can be present in amounts of up to 25 mol percent based on the mols of comonomer units in the original copolymer. Preferably, the mol percent silane is about 1–10 percent.

The silanes employed to react with the copolymers have the formula: Y—Q—T—Z, where Y is selected from the class consisting of radicals having the formula

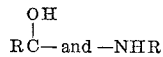

Q is a divalent radical having 1 to 22 carbon atoms that is bonded through a carbon atom to both T and Y. Q is preferably a divalent hydrocarbon radical such as an aromatic, aliphatic, cyclic, or heterocyclic radical. Q may be substituted with one or more groups selected from the class consisting of esters, ethers, tertiary amines, amides, ketones, aldehydes, nitriles, and halides. Q may also be substituted with one or more siloxane radicals having the formula

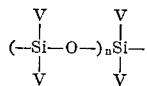

where $n$ is 1 to 28, provided the siloxane radical is bonded to the remainder of the Q radical through carbon atoms, T is a silicon containing radical selected from the class consisting of

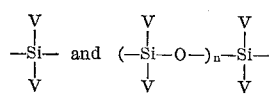

where $n$ is 1 to 28. Z is a hydrolyzable radical preferably selected from the class consisting of —OR, —Cl, —Br, —OOCCH$_3$,

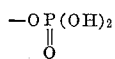

phenyl and substituted phenyl groups, —NR$_2$, and —SR. The R in Y and Z is a radical selected from the class consisting of hydrogen and hydrocarbon containing radicals containing 1 to 22 carbon atoms. Thus, R may be aromatic, aliphatic, cyclic, or heterocyclic, and may be substituted with one or more groups selected from the class consisting of esters, ethers, tertiary amines, amides, ketones, aldehydes, nitriles, halides and silicon containing radicals; V is selected from the class consisting of R and Z.

A simple silane molecule useful in the reaction with the acid halide group is

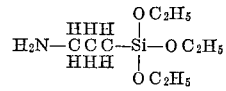

in other words, the case where Y is —NH$_2$, where Q is propyl, T is

and V is the same as Z and Z is ethoxy.

It can thus be seen that the only critical features in the silane molecule are that it contains an alcoholic radical, an amine radical, a radical on a silicon atom that is hydrolyzable, and that the alcoholic radical or amine radical and the group containing the silicon atom having the hydrolyzable radical be bonded through a carbon atom to a divalent radical having 1 to 22 carbon atoms. The other variants that may be present in the radicals of the silane molecule are not critical.

The reaction between the acid halide containing copolymer and the silane molecule is illustrated by means of the following chemical equation:

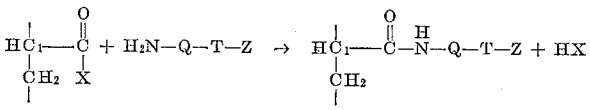

where C$_1$ is a carbon atom in the ethylene/alpha-beta-ethylenically unsaturated carboxylic acid halide chain, X is halide, Q, T, Z and R are as defined above.

The silane group containing copolymers whether derived from an alpha-olefin/alpha-beta-ethylenically unsaturated carboxylic acid copolymer or from an alpha-olefin/alpha-beta-ethylenically unsaturated carboxylic acid halide copolymer will all contain the radical

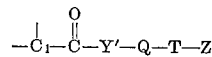

where C$_1$ is a carbon atom in the main copolymer chain, Y' is selected from the class consisting of —O— and

Q is a divalent radical having 1 to 22 carbon atoms that is bonded through carbon atoms to both Y' and T, T is a silicon containing radical selected from the class consisting of

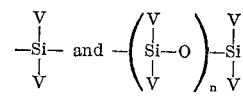

where $n$ is 1 to 28, Z is a hydrolyzable group, preferably —OR, —Cl, —Br, —OOCCH$_3$,

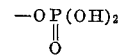

phenyl or substituted phenyl groups, —NR$_2$ and —SR, R is a radical selected from the class consisting of hydrogen and hydrocarbon containing radicals having 1 to 22 carbon atoms, and V is selected from the class consisting of R and Z.

It will be noted that the Z radical of the formula set forth above for the silane compound is a radical that is readily hydrolyzable. The Z radical is a very important portion of the copolymer molecule, for by the addition of moisture to the copolymer, the Z radicals hydrolyze and then condense to form —Si$_3$—O—Si$_4$-crosslinks, where Si$_3$ and Si$_4$ are silicon atoms in different T radicals thus making the copolymers intractable and improving the cut-through resistance, abrasion resistance and the like. The hydrolyzable character of the Z radical can also be used to form coatings on various substrates, especially meal substrates, glass substrates, and metal oxide substrates. In the case of silica glass substrates, the copolymers are linked directly to the silica atoms of the substrate through a silicon atom of the glass surface. A significant advantage of the copolymers of this invention is that the crosslinking is readily controlled and does not occur under fabrication conditions until the composition is contacted with water.

In the case of metal and metal oxide substrates the exact mechanism by which the copolymer becomes bonded to the substrate is unclear, and may depend in part on the conditions under which the copolymer is applied to the substrate; however, it is believed that the copolymer either reacts directly with the base, as is the case with silica substrates, or the silane groups hydrolyze and hydrogen bond to the base; a combination of both is also quite possible. In any event the substrate and the copolymer are tightly bonded together. The bonding between the copolymer and the various substrates can thus be generalized as follows:

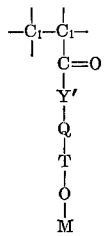

where $C_1$ is a carbon atom in the main copolymer chain, $Y'$ is a divalent radical selected from the class consisting of —O— and

Q is a divalent radical having 1 to 22 carbon atoms that is bonded through carbon atoms to both $Y'$ and T, T is a silicon containing radical selected from the class consisting of

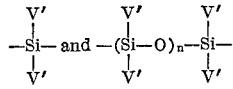

where $n$ is 1 to 28, $V^1$ (a V radical that may have hydrolyzed and reacted since V can be Z) is selected from the class consisting of —OR, —CL, —Br, —COCCH$_3$,

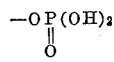

phenyl and substituted phenyl, —NR$_2$, —SR, R, OSi$_4$ and M, where R is a radical selected from the class consisting of hydrogen and hydrocarbon containing radicals containing 1 to 22 carbon atoms, where $Si^4$ is a silicon atom in a different T radical, and M is selected from the class consisting of an atom in the substitute and —H which is hydrogen bonded to the substrate. O is, of course, oxygen.

The bonding of the copolymers to the substrate and the crosslinking reaction can be very rapid. This reaction, hydrolysis and condensation, is accelerated in compositions which contain acid by-product. The presence of the acid speeds up further hydrolysis and further condensation.

The silane modified copolymer may be applied to the substrate by painting or spraying a solution of the copolymer on the substrate or by dipping the substrate in the solution. The copolymer may also be applied as a melt. Other coating techniques may also be employed.

An alternative method of producing the coated substrates for use in the present invention is to treat the silicic substrate with a silane with the formulas previously described, and then treat the substrate with a carboxylic acid halide polymer solution. The acid halide reacts with the Y group to produce the chemical bond. This alternative process does not produce a Si—O—S icrosslinked copolymer surface.

Since the silicic base is chemically bonded to the copolymer may be applied between silicic surfaces and used as an adhesive cohesive for bonding the silicic surfaces together.

The copolymers are particularly useful in the formation of coatings on paper, wood, metal, metal oxides, glass, and other polymers.

Many different types of silicic surfaces are known that can be used as the substrate of this invention. Silicates in general and glasses, clays, cements, and feldspars in particular are examples of useful silicic surfaces. The metals and metal oxides particularly useful as substrates are the ferrous metals, titanium, copper, zinc, aluminum, tin, lead, cadmium, chromium and magnesium.

The copolymer coated substrate is now bonded to a hydrocarbon plastic material to produce the composites of the present invention. It is preferable to produce the composite by contacting the hydrocarbon polymer and the copolymer coated substrate under conditions such that the hydrocarbon polymer is in a molten state, although it is possible to produce the composites of the present invention by applying the hydrocarbon polymer from a solution of the polymer in a solvent and then vaporizing the solvent. Particularly useful hydrocarbon polymers are the polyolefins, such as polyethylene, both high and low density, polypropylene, and copolymers of ethylene and/or propylene with dienes, such as hexadiene; also, the ionic hydrocarbon polymers of U.S. Pat. 3,264,272.

Hydrocarbon molding granules containing copolymer coated glass fibers is one of the composites of the present invention. These composites can be readily made by coating the glass fibers as they are spun either by spraying them with a solution of the copolymer or by passing the fibers, either before or after combining several hundred fibers together to form a roving, through a solution of the copolymer (such sizing techniques are well known in the art) followed by hydrolyzing the coating to form a bond to the glass and then chopping the fiber. The coated chopped fiber can then be fed directly into an extruder along with pellets of hydrocarbon polymer. In the extruder the hydrocarbon polymer melts and becomes firmly and intimately bonded to the copolymer coating on the fibers. The coating on the fibers acts to lubricate and protect the fibers in the extruder and consequently a product having a longer average fiber length is obtained than would be obtained if uncoated fibers were subjected to the same treatment. The extrudate is preferably cut into molding size granules while the hydrocarbon polymer is still molten, using standard melt cutting apparatus known in the art. Such a melt cutting procedure has the particular advantage of not shattering the composite as it is cut. Molding granules will generally contain between about 1 to about 60% coated glass fibers by weight of the granule.

Relatively long fiber length in molding granules imparts higher strength in final articles produced from the molding granules. It has been found that if the time the hydrocarbon polymer coated glass fiber mixture is in the extruder is kept to a minimum, the glass fiber length is maximum. It is also desirable to extrude at a melt temperature range about 50° C. above the injection molding temperature range of the hydrocarbon polymer. It has been further shown that if the fibers are added to the extruder in the form of a coated chopped roving (bundles) the mixture of polymer and bundles handles more easily the thicker the bundles are. For a given number of fibers, a flat ribbon-like bundle is preferred. Apparently, the fiber bundles (pieces of roving) are "smeared" by the action of the extruder and thus become uniformly dispersed in the hydrocarbon polymer with a minimum of fiber breakage. Fiber breakage can be decreased by using an extruder screw that is relatively smooth and has flights that are relatively shallow in comparison to the diameter of the screw. By way of illustration a screw having a diameter of 2 inches should have flights on its mixing head of a height of about 1/10 inch to produce an extrudate having the relatively long fiber length.

The amount of copolymer applied to the glass fibers will generally be in the range of 0.01 to about 3% by weight of the coated glass fiber and preferably 0.4 to 1.0%. This amount is sufficient to coat each fiber and form a basis for the hydrocarbon polymer to become bonded to the copolymer coating.

All commercially available glass fibers that are substantially free from organic coatings are useful to make the composites. The fibers known commercially as G and K diameter fibers are entirely satisfactory. Such fibers may be purchased in rovings having 204 to 2040 fibers per roving, but rovings having other amounts of fibers could be used. Glass fibers having diameters in the range of about 0.00036 to about 0.00051 inch are entirely satisfactory, and other diameters may be used.

Maximum strength in the final molded article made from the molding granule composite of the present invention is achieved if the glass fibers are fed to the extruder in lengths of between about 1/16 and 1/2 inch.

The dimensions of the molding granules may vary widely from about 1/16 inch by 1/16 inch to about 1/4 inch by 1/2 inch.

The exact chemical composition of the glass substrate is not critical as far as the bonding of the copolymer to the substrate is concerned, but, of course, will affect the physical properties of the final article.

In the following examples which illustrate the invention, all parts and percentages are in parts by weight unless otherwise specified.

EXAMPLE 1

Ethylene-methacrylic acid copolymer, whose composition was 78.4 weight percent ethylene units and 11.4 weight percent methacrylic acid units, having a melt index of 4.9 g./10 min., was completely converted to the acid chloride derivative using phosphorous pentachloride. An infrared scan of a film pressed from the ethylene-methacrylyl chloride polymer had a peak at 5.6 microns due to the acid chloride carbonyl and no peaks at 3.0, 6.1 and 6.6 microns.

Two grams of this ethylene-methacrylyl chloride polymer were dissolved in 100 cc. of carbon tetrachloride with heating and stirring at 60° C. When the polymer was completely in solution, 5.3 cc. of a solution of gamma-aminoproply-triethoxy-silane (made from 1 cc. of gamma-aminopropyl-triethoxy-silane and 9 c. of carbon tetrachloride) were added to react with the polymer. A film of the purified product was examined under infrared which confirmed the product to be ethylene methacrylamidopropyltriethoxysilane polymer. The spectrum showed amide peaks at 3.0, 6.1 and 6.6 microns.

Two glass panes were coated at their edges with this solution, and pressed on opposite sides of a polyethylene gasket. The sealed entity was an insulated window pane with a space between the parallel glass sheets.

EXAMPLE 2

Ethylene-acrylic acid copolymer of about 6 weight percent acrylic acid having a melt index of 15 g./10 min. was converted to the acid chloride derivative. An infrared scan of a film of this material showed a peak at 5.6 microns caused by the acid chloride carbonyl; no peaks appeared at 3.0, 6.1 or 6.6 microns.

One gram of the ethylene-acrylyl chloride polymer was dissolved in 200 cc. of tetrachloroethylene with heating and stirring. 1.5 cc. of a solution of gamma-aminopropyl-triethoxysilane, made from 1 cc. of gamma-aminopropyl-triethoxysilane and 9 cc. of tetrachloroethylene, were added to the polymer solution to react with it. An infrared scan of a film cast from the product showed that reaction had taken place as the 5.6 micron peak of the acid chloride carbonyl had decreased in size while amide peaks appeared at 3.0, 6.1 and 6.6 microns.

When glass microscope slides with an uncontaminated surface were dipped in the product solution, it was then possible to melt bond polyethylene to the primed surface. 180° peel strengths of these bonded coatings went as high as 20 lb./in.

EXAMPLE 3

Ten grams of ethylene-fumaric acid copolymer of about 3.6 weight percent fumaric acid having a melt index of 200 g./10 min., were dissolved in 300 cc. of tetrachloroethylene at 70° C. 1.75 grams of phosphorous pentachloride were added to the solution which was kept stirred and heated at 70° C. for over four hours. The polymer product was precipitated from the solution with the addition of dry acetone. The precipitate was then filtered, washed with acetone and dried in a vacuum oven under a nitrogen bleed at room temperature. An infrared scan of a film pressed from the product showed it to be the acid chloride derivative of the original polymer as shown by the acid chloride carbonyl peak at 5.6 microns while there were no peaks at 3.0, 6.1 or 6.6 microns.

One gram of this acid chloride polymer was dissolved in 100 cc. of carbon tetrachloride with heating and stirring. 1.1 c. of a solution made from 1 cc. of gamma-aminopropyltriethoxysilane in 9 cc. of carbon tetrachloride was added to the acid chloride polymer solution to react with it. An infrared scan of a film cast from this solution showed that reaction had taken place, as evidenced by a reduction in the size of the acid carbonyl peak at 5.6 microns and by the presence of amide peaks at 3.0, 6.1 and 6.6 microns.

When a series of clean glass slides with uncontaminated surfaces were primed with this final product solution, they were found to be capable of adhering to polyethylene when it was melted on them.

EXAMPLE 4

Ten grams of an ethylene-itaconic acid copolymer containing about 6 weight percent itaconic acid units having a melt index of 100 g./10 min., were dissolved in 350 c. of tetrachloroethylene with heating and stirring in approximately half an hour. Ten grams of phosphorous pentachloride were then added to react with the polymer in solution. After four hours, the reaction product was precipitated with dry acetone, filtered, washed with dry acetone and dried under vacuum at room temperature. An infrared scan of a film pressed from this product showed that reaction had taken place as was evidenced by an acid chloride carbonyl peak at 5.6 microns. There were no peaks at 3.0, 6.1 and 6.6 microns.

Two grams of the acid chloride polymer were dissolved with heating and stirring in 100 cc. of carbon tetrachloride. 2.8 cc. of a solution made from 1 cc. of gamma-aminopropyltriethoxysilane and 9 cc. of carbon tetrachloride were added to react with the acid chloride polymer solution. An infrared scan of a cast film of this final product showed reaction had taken place by the decrease in the acid chloride carbonyl peak at 5.6 microns and by the appearance of amide peaks at 3.0, 6.1 and 6.6 microns.

When a cast film of this final product had been exposed to the atmosphere, it crosslinked and showed little flow when pressed at 40,000 lbs. for 2 minutes at 200° C. between 8-inch square platens. Seven hours extraction of a similarly exposed film of the final product with refluxing carbon tetrachloride in a jacketed Soxhlet, showed the material to be 94 weight percent insoluble as a result of the crosslinking despite the fact that prior to crosslinking the material was completely soluble.

Two glass panes were coated on one surface with the solution of reaction product of acid chloride polymer and gamma-aminopropyltriethoxysilane, and then bonded to opposite surfaces of a transparent polyolefin film comprising ethylenemethacrylic acid copolymer whose acid groups had been partially ionically crosslinked with sodium ions. The product was an inexpensive safety glass window which did not shatter when broken.

EXAMPLE 5

Ten grams of a polymer made by grafting 4 grams methacrylic acid onto 20 grams linear polyethylene having a melt index of 2 g./10 min., were heated and stirred in 350 cc. of tetrachloroethylene for 1½ hours. Twenty grams of phosphorus pentachloride were then added to the mixture and allowed to react with heating and stirring for five hours. The product which was in solution was precipitated by the addition of dry acetone, filtered, washed with dry acetone and then vacuum dried at room temperature. An infrared scan run on a film pressed from the product showed by the appearance of an acid chloride carbonyl peak at 5.6 microns that reaction had taken place to give the acid chloride polymer.

Two grams of the acid chloride polymer were dissolved in 100 cc. of carbon tetrachloride with heating and stirring 8.2 cc. of a solution made from 1 cc. of gamma-aminopropyltriethoxysilane in 9 cc. of carbon tetrachloride were added to react with the acid chloride polymer solution.

Glass fiber was sprayed with this solution and then used as a reinforcement for polyethylene molded plaques.

EXAMPLE 6

Two grams of ethylene-methacrylyl chloride polymer, which had been made from ethylene-methacrylic acid copolymer having a melt index of 4.9 g./10 min. which contained 11.6 weight percent methacrylic acid units, was dissolved in 200 cc. of tetrachloroethylene with heating and stirring. When the polymer was in solution, 0.687 gram of p-aminophenyltriethoxysilane were added to react with the polymer in solution.

When glass was primed with this product, it bonded well to polyethylene which was melted on to it.

EXAMPLE 7

Two grams of ethylene-methacylyl chloride copolymer made from ethylene-methacrylic copolymer having a melt index of 42.5 g./10 min., containing 17.4 weight percent methacrylic acid units, were dissolved in 100 cc. of toluene with heating and stirring at 60° C. When the polymer was in solution, 1.23 grams of methyl-N-[(2-methyl - 5 - thienyl)methyl]aminopropylmethyldiethoxysilane were added to react with the polymer. Glass was primed with this product and polyethylene was bonded to it by melting the polyethylene.

EXAMPLE 8

Three grams of ethylene-methacrylyl chloride polymer, made from ethylene-methacrylic acid copolymer having a melt index of 580 g./10 min., which contained 5.0 weight percent methacrylic acid units, were dissolved in 200 cc. of perchloroethylene with stirring at a temperature just below the boiling point of the solvent. When the polymer was in solution, 0.855 gram of 2,4-dihydroxybenzophenone - 4 - sulfonamidopropyltriethoxysilane was added to the solution to react with the polymer. Two glass panes were coated in the manner described in Example 4, and the results were substantially the same.

In Examples 1 to 8 the melt index (M.I.) of the polymers prior to halogenation was as follows: Examples 1 and 6, M.I. 4.9; Example 7, M.I. 42.5; Example 2, M.I. 15; Example 3, M.I. 200; Example 4, M.I. 100; Example 5, the polyethylene had a M.I. of 2; Example 8, M.I. 580.

EXAMPLE 9

Two grams of ethylene-methacrylyl chloride polymer described in Example 1 were reacted with 0.53 cc. of gamma-aminopropyltriethoxysilane and used to coat woven glass tape by priming the tape with a solution containing 0.5 gram of polymer per 100 cc. of perchloroethylene. The glass-polymer composite so formed was then used as reinforcement in a polyethylene pipe.

The process of any of the Examples 1–9 can be repeated with substantially the same results using silane compounds having the following formulas:

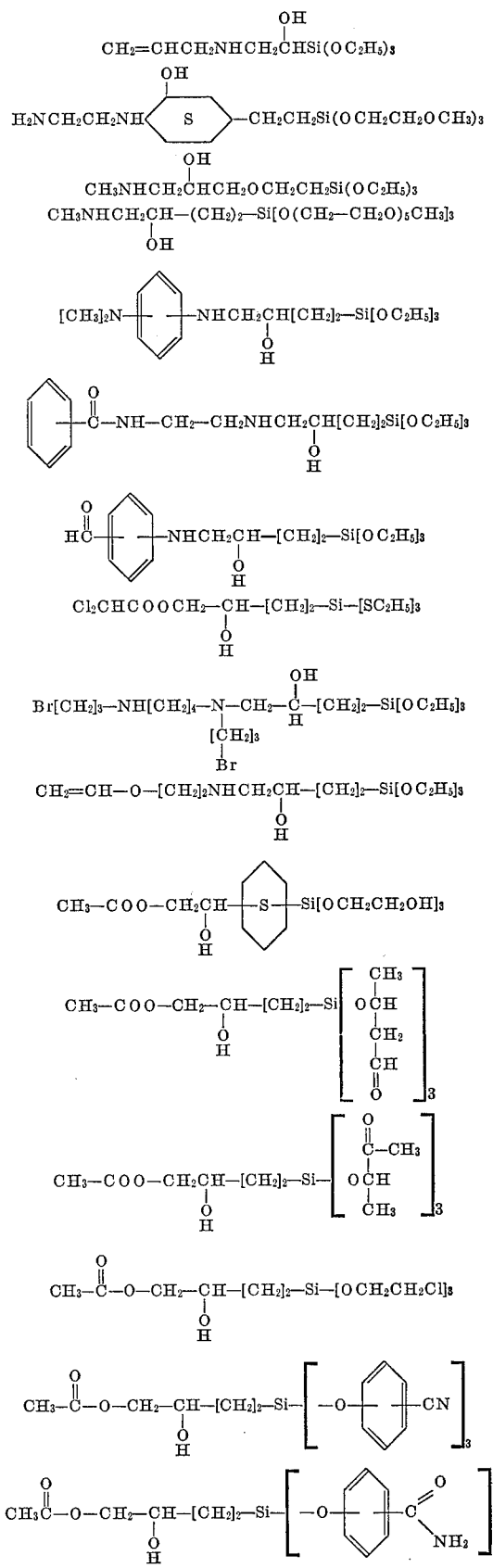

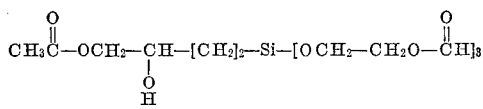

EXAMPLE 10

Eighteen grams of an ethylene-methacrylyl chloride polymer containing 12 weight percent methacrylyl chloride units were dissolved in 600 cc. of tetrachloroethylene. The solution was heated to over 100° C. and then 4.86 cc. of gamma aminopropyltriethoxysilane were added to react with it. The solution was then heated to reflux temperature and refluxed for more than 2 hours with a dry nitrogen purge bubbling through it. The solution was cooled to 52° C. and then 4.62 cc. of acetyl chloride were added to it and the solution reheated and refluxed for another 1½ hours with a dry nitrogen purge. The sollution was cooled overnight and a further 4.62 cc. of acetyl chloride were added at 23° C. The solution was heated and refluxed for several hours. The condenser was then removed and volatiles were distilled off. Make-up tetrachloroethylene was added as required. An infrared scan of the product showed reaction had taken place. Amide absorptions in the regions 2.95, 6.1, and 6.6 microns show the silane has reacted with the polymer. The alkoxy absorptions have decreased due to the replacement of alkoxy groups by chlorines on the silicons to produce absorptions in the 14.3, 16.8 and 17.6 micron region. Glass primed with a solution of this polymer offered good adhesion to polyethylene melted on to it.

EXAMPLE 11

Twelve grams of an ethylene/methacrylyl chloride copolymer containing 19.8% methacrylyl chloride units were dissolved in 600 cc. of tetrachloroethylene with heating and stirring. The polymer in the solution was then reacted with one equivalent, 5.4 cc., of gamma aminopropyltriethoxysilane. The solution was refluxed for 1¾ hours with a dry nitrogen purge bubbling through the solution. The purge was then changed to dry HCl gas, the condenser was removed and the solution was allowed to purge while it cooled slowly to 70° C. During this period a considerable amount of ethanol was purged from the solution. The condenser was then replaced and 10 cc. of thionyl chloride was added to the solution which was heated up again and refluxed for 2 hours with the dry HCl gas purge bubbling through it. The condenser was then removed again and volatiles were allowed to purge off. During the whole operation, make-up quantities of tetrachloroethylene were added to the solution whenever required by the solvent loss. An infrared scan of the final product in solution showed the material to be an ethylene/methacrylamidopropyltrichlorosilane polymer which was characterized by amide absorptions in the 2.95, 6.0 and 6.6 micron regions and by chlorosilane absorptions in the 14.3, 16.8 and 17.6 micron regions. Glass primed with a solution of this polymer offered good adhesion to polyethylene melted on to it.

EXAMPLE 12

Eighteen grams of an ethylene-methacrylyl chloride polymer containing 12 weight percent methacrylyl chloride groups were dissolved in 600 cc. of tetrachloroethylene. The solution was heated to over 100° C. and then 4.86 cc. of gamma aminopropyltriethoxysilane were added to react with it. The solution was then heated to reflux temperature and then refluxed for more than two hours with a dry nitrogen purge bubbling through it. The solution then had 15 cc. of ethanol added to it and was reheated to reflux for a further 2 hours with dry nitrogen bubbling through it as a purge. The condenser was then removed and volatiles were distilled off from the solution. Make-up quantities of tetrachloroethylene were added to the solution as necessary. An infrared spectrum of a cast film of the polymer product showed that the silane had reacted with, and was bonded to the polymer molecule through an amide linkage as was shown by amide absorptions in the 2.95, 6.1, and 6.6 micron regions. The presence of alkoxy (ethoxy) groups on the silicon atoms was shown by absorptions in the 8.6, 9.1 9.3 and 10.45 micron regions. The product polymer was taken in a solution of 600 cc. of tetrachloroethylene, which contained 18 grams of polymer, and was cooled to room temperature before 4.81 cc. of acetyl bromide was added to react with it. The solution was then heated up to reflux temperature and refluxed with a dry nitrogen purge bubbling through it for several hours. The solution was cooled to room temperature and a further 4.81 cc. of acetyl bromide were added before the procedure was repeated. One further addition of acetyl bromide was effected in the same way. The condenser was then removed and volatiles were distilled off with make-up tetrachloroethylene being added as necessary. The final polymer product solution was yellow in color. The polymer product was examined by infrared and this showed that reaction had been accomplished as the alkoxy absorption had been decreased and Si-halogen absorptions appeared in the 14.3 micron region. The polymer solution was found effective for priming glass for the subsequent adhesion of polyethylene.

EXAMPLE 13

A solution of the polymer formed by reacting a polymer of ethylene-methacrylyl (88 weight percent ethylene) with a stoichiometric amount of gamma amino propyltriethoxysilane was made whose concentration was 1 gram of polymer in 200 cc. of tetrachloroethylene.

A series of metal sheets of aluminum, gold anodized aluminum, mild steel, chromium and copper were primed with this solution and then linear polyethylene was applied on them in a melted state. On cooling to room temperature the composites were left to age for two weeks. The polyethylene came loose from the unprimed sections but where the metal sheets had been primed, extremely good adhesion existed and gave high peel strengths.

EXAMPLE 14

Continuous glass fiber roving consisting of a bundle of 2040 fibers of 0.0005 inch diameter was coated with a solution of ethylene/methacrylamidopropyltriethoxysilane polymer obtained by reaction of aminopropyl triethoxysilane and an ethylene methacrylyl chloride copolymer (obtained by treatment of a random ethylene/methacrylic acid copolymer [M.I. of 87.5] with thionyl chloride) containing 17.5 weight percent methacrylyl chloride units, by passing the roving over a 4-inch diameter steel roller which was dipping in and rotating in a solution of 0.6% of the coating resin in tetrachloroethylene at room temperature. Sufficient solution is picked up (by adjusting the linear speed of the roving over the roller) to result in 0.5% final "add-on" weight of the resin on the roving. The roving wetted with the solution of coating resin is next passed through a hot oven through which air is being blown. The oven is maintained at 200° C., and steam is simultaneously blown into the oven to hydrolyze the coating resin. The strand of glass roving is next chopped into ½ inch lengths by a cutter consisting of an idler roll, a feed roll and a cutter roll. The approximate dimensions of the chopped roving were ½ x ⅒ x ¹⁄₁₀₀ inch. The chopped roving is next mixed with high density polyethylene resin (0.97 density, 17.5 melt index and 50 p.p.m. antioxidant) by tumbling the two in a fiber drum for 4 minutes employing 30 parts of glass fiber and 70 parts of polyethylene in the form of small pellets ⅛ inch diameter. This dry blend was next fed into a hopper of a 2½ inch diameter screw extruder and fed by gravity into the center of the throat of the extruder. The extruder is a single flighted screw having a conveying section, a gradual compression section, and a metering section connected to a three-flighted mixing screw section with shallow flight depth. The extruder was operated at 50 r.p.m., a barrel temperature of 290° C. at the inlet end and reaching a barrel temperature of 265° C. at the exit of the extruder. The intimately incorporated glass fiber and polyethylene was forced through two ¼ inch diameter holes as strands which are drawn down to about ⅛ inch diameter and cooled by a water bath approximately 20° C. and then dried with an air-knife before being fed to a cutter to chop the warm strands into ⅛ inch pellets 0.4 inch long. The dry pellets subsequently are fed to an injection molding machine and molded into test bars and compared with properties of the same polyethylene but containing no glass fiber and also with a similar mixture of 30 parts fiber plus 70 parts of the same polyethylene but without the polymeric silane coating on the glass fiber. The comparative properties are as follows:

TABLE A.—GLASS FIBER REINFORCED POLYOLEFINS

| Property | Units | Polyethylene | | Polypropylene | |
|---|---|---|---|---|---|
| Percent glass fiber | | —0 | 29.4 | 0 | 28.1 |
| Tensile strength | p.s.i | 3,000 | 9,860 | 5,000 | 9,600 |
| Elongation | Percent | 400 | 4.0 | >200 | 1.9 |
| Flexural strength | p.s.i | | 13,700 | | 14,100 |
| Flexural modulus | p.s.i | 160,000 | 750,000 | | 757,000 |
| Heat distortion temp. at 264 p.s.i | °C | | 125 | | 142 |
| Notched izod impact 73° F | Ft. lb./in | 0.5 | 3.6 | 0.4 | 1.38 |
| Notched izod impact —40° F | Ft. lb./in | | 3.6 | | 1.40 |

In order to show the beneficial effect of the silane coating on the glass fiber versus uncoated glass fiber, some uncoated glass fiber was mixed with polyethylene resin and then intimately incorporated into the resin by passage through the extruder. The resulting pellets containing 30% of glass fiber were compression molded into plaques and then tested as follows:

TABLE B.—EFFECT OF POLYMERIC COATING ON GLASS FIBER [30% GLASS FIBER IN POLYETHYLENE]

| | Uncoated fiber | Coated fiber |
|---|---|---|
| Tensile strength (p.s.i.) | 3,060 | 7,400 |
| Elongation, percent | 7 | 12 |
| Izod impact 73° F. (ft. lb./in. notch) | 0.7 | 3 |
| Izod impact —40° F. (ft. lb./in. notch) | 0.7 | 3 |
| Stiffness (p.s.i.), ASTM D 747 | 246,000 | 278,000 |
| Heat distortion temp. at 264 p.s.i. (° C.) | 80 | 102 |

Note that these results for the coated fiber differ from those shown in Table A because the samples in Table B were compression molded instead of being injection molded as in Table A. The two samples of Table B were handled alike and show that the tensile strength and the impact strength are approximately doubled by adding the polymer coating to the glass fiber.

EXAMPLE 15

Continuous glass roving was coated with ethylenemethacrylamidopropyltriethoxysilane polymer which was allowed to hydrolyze and crosslink binding the filaments together. The strand was chopped into half-inch long bound bundles of filaments. This chopped glass fiber was dry blended with linear polyethylene with a melt index of 17.5 in the form of small pellets such that the blend contained 30 weight percent glass fiber. The dry blend of polymer and glass fiber was dumped in the hopper of a 2½ inch extruder so that the screw was flood fed under gravity. The extruder had a single flighted screw with a conveying section, a gradual compression section, a metering section; on the end of this was a three flighted mixing screw with a shallow flight depth. The extruder was operated at a screw speed of 50 r.p.m., a melt temperature of 240–245° C., and a melt pressure of 175–200 p.s.i. at the two ¼ inch diameter holes die. A product throughout of about 50 pounds per hour was obtained as two strands which were water quenched and chopped. In the product the fiber bundles had been dispersed as the filaments in the polymer matrix. Compression molded plaques were stiff and uniform in appearance. Samples of the product were fed to an injection molding machine to produce test bars. The test bars had the following properties:

Tensile strength—8,600 p.s.i.
Flex strength—11,800 p.s.i.
Izod impact—2.8 ft. lb./in.
Elongation—5.8%
Flex modulus—671,000 p.s.i.
Heat distortion temp. at 264 p.s.i.—121° C.

EXAMPLE 16

Chopped half-inch long glass fiber of the same type as described in Example 15 was dry blended with linear polyethylene pellets of a melt index of 6 so that the final blend contained 30 weight percent glass fiber. This dry blend was dumped in the hopper of a 1½ inch extruder so that it was flood feeding to the screw. The screw had a single flighted conveying section, short transition section and a metering section followed by a four flighted shallow mixing screw. The extruder was operated at 40 r.p.m. screw speed, a melt temperature of 274° C. and a melt pressure of 200 p.s.i. just before the ³⁄₁₆ inch circular single hole die. An extrusion rate of 9 pounds per hour of product was obtained as a strand which was lightly water quenched so that it was handleable though still hot before it was chopped into pellets. In the product the fiber was dispersed in the polymer as filaments. Samples of the product were fed to an injection molding machine to produce test bars. The test bars had the following properties:

Tensile strength—9,390 p.s.i.
Flex strength—12,800 p.s.i.
Izod impact—3.2 ft. lb./in.
Elongation—5.5%
Flex modulus—662,000 p.s.i.
Heat distortion temp. at 264 p.s.i.—122° C.

EXAMPLE 17

Chopped half-inch long glass fiber of the same type described in Example 15 was dry blended with pellets of linear polyethylene of a melt index 3 so that the final dry blend contained 30 weight percent glass fiber. The material was processed in an extruder described in Example 16 in which the fiber was dispersed in the polymer melt. The extruder was run at a screw speed of 40 r.p.m., a melt temperature of 273° C. and a melt pressure at the die of 250 p.s.i. A throughput of 8 pounds per hour of material was obtained. Samples of the product were fed to an injection molding machine to produce test bars. The test bars had the following properties:

Tensile strength—9,590 p.s.i.
Flex strength—13,400 p.s.i.
Izod impact—2.5 ft. lbs./in.
Elongation—4%
Flex modulus—806,000 p.s.i.
Heat distortion temp. at 264 p.s.i.—122° C.

EXAMPLE 18

Continuous glass roving was coated with ethylene-vinyl acetate-methacrylamidopropyltriethoxysilane polymer which was allowed to hydrolyze and crosslink binding the filaments together. The strand was chopped into quarter-inch long bound bundles of filaments. This chopped glass fiber was dry blended with pellets of free radical polyethylene with a melt index of 1.9 so that the final blend contained 29 weight percent glass fiber. The material was processed in an extruder described in Example 16 in which the fiber was dispersed as filaments in the melt. The extruder was run at a screw speed of 40 r.p.m., a melt temperature of 247° C. and a melt pressure at the die of 225 p.s.i. A throughput of 7¾ pounds per hour was obtained. Samples of the product were fed to an injection molding machine to produce test bars. The test bars had the following properties:

Tensile strength—3,340 p.s.i.
Flex strength—4,800 p.s.i.
Izod impact—3.74 ft. lb./in.
Elongation—3.5%
Flex modulus—267,000 p.s.i.
Heat distortion temp. at 264 p.s.i.—70° C.

EXAMPLE 19

Fine steel wool which had been chopped was coated with an ethylene - methacrylamidopropyltriethoxysilane polymer from solution in tetrachloroethylene. The solvent was dried off and the coated chopped steel wool was left exposed to the atmosphere so that the polymer might hydrolyze and crosslink. The fiber was then heated in an air oven for an hour at about 150° C. The same extruder described in Example 16 was used to incorporate the steel wool into linear polyethylene of melt index 3. The polymer and the fiber was manually fed separately in a ratio of 4:1 by weight to the extruder in small weighed lots. The extrudate was collected and fed manually to the extruder with more steel wool in small weighed lots in a ratio of 4:1. The extruder was operated at 30 r.p.m. screw speed and a melt temperature between 245–250° C. The steel wool was dispersed in the polymer to give a grey colored extrudate which was quenched with water and then the strand was chopped. Samples of the product were fed to an injection molding machine to produce test bars. The test bars had the following properties:

Tensile strength—3,950 p.s.i.
Flex strength—5,200 p.s.i.
Izod impact—2.04 ft. lb./in.
Elongation—31%
Flex modulus—314,000 p.s.i.
Heat distortion temp. at 264 p.s.i.—58° C.

EXAMPLE 20

Aluminum wool was chopped and then coated with ethylene-methacrylamidopropyltriethoxysilane polymer from a solution in tetrachloroethylene. The polymer was exposed to the atmosphere so that it might hydrolyze and crosslink. The same extruder described in Example 16 was used to incorporate the aluminum into linear polyethylene of melt index 3. The aluminum and the polyethylene were fed manually as the components which had been weighed out into small lots whose ratio was 3:7 respectively. The extruder was operated at a screw speed of 42 r.p.m., a melt temperature of 177° C. and a melt pressure at the die of 300 p.s.i. The aluminum was dispersed in the polymer to give a silvery-grey colored product strand which was water quenched and then chopped. Samples of the product were fed to an injection molding machine to produce test bars. The test bars had the following properties:

Tensile strength—3,620 p.s.i.
Flex strength—4,410 p.s.i.
Izod impact—1.94 ft. lb./in.
Elongation—20%
Flex modulus—271,000 p.s.i.
Heat distortion temp. at 264 p.s.i.—67° C.

EXAMPLE 21

Continuous glass roving which was similarly coated to that described in Example 15 and chopped into quarter-inch long bundles of filaments was dry blended with linear polyethylene pellets of melt index 3 to give a blend containing 30 weight percent glass fiber. This dry blend was processed in an extruder described in Example 15 to incorporate the glass fiber as dispersed individual filaments in the polyethylene melt. The extruder was operated at a screw speed of 70 r.p.m., a melt temperature of 241° C. and a melt pressure of 650 p.s.i. at the die. A product throughput of about 85 pounds per hour was obtained as two strands which were lightly water quenched. This light quench solidified the surface polymer thus removing its tack and the strands were then chopped very warm which gave a better cut.

EXAMPLE 22

Chopped half-inch long glass fiber of the same type described in Example 15 was dry blended with polypropylene so that the dry blend contained 10 weight percent polypropylene. The material was processed in the extruder described in Example 16 to disperse the fibers as filaments in the polymer melt. The operating conditions were a screw speed of 30 r.p.m., a melt temperature of 224° C. and a melt pressure of 120 p.s.i. at the die. A product rate of 5 pounds per hour was obtained. Samples of the product were fed to an injection molding machine to produce test bars. The test bars had the following properties:

Tensile strength—5,930 p.s.i.
Flex strength—8,760 p.s.i.
Izod impact—0.73 ft. lb./in.
Elongation—4.7%
Flex modulus—312,000 p.s.i.
Heat distortion temp. at 264 p.s.i.—121° C.

EXAMPLE 23

Continuous glass strand which was coated with ethylenemethacrylamidopropyltriethoxysilane polymer from a tetrachloroethylene solution as it was spun to bind the filaments together was dried and chopped into quarter inch lengths. Exposure to the atmosphere allowed for hydrolysis and crosslinking of the polymer. A dry blend of this chopped fiber was made with pellets of linear polyethylene which had a melt index of 17.5 such that the final blend contained 31 weight percent glass fiber. The material was processed in an extruder described in Example 16 to incorporate the fiber as dispersed filaments in the polymer melt. The extruder was operated at a screw speed of 40 r.p.m., a melt temperature of 250° C. and a melt pressure of 100 p.s.i. at the die. The extrudate was lightly quenched in water and chopped into uniform pellets of material ready for molding. Samples of the product were fed to an injection molding machine to produce test bars. The test bars had the following properties:

Tensile strength—10,200 p.s.i.
Flex strength—14,400 p.s.i.
Izod impact—3.0 ft. lb./in.
Elongation—5.5%
Flex modulus—772,000 p.s.i.
Heat distortion temp. at 264 p.s.i.—124° C.

EXAMPLE 24

Continuous glass roving which was coated with ethylenevinyl acetate - methacrylamidopropyltriethoxysilane polymer from a tetrachloroethylene solution to bind the filaments together was chopped into quarter-inch lengths. Exposure to the atmosphere allowed for hydrolysis and crosslinking of the polymer. The chopped fiber was dry blended with pellets of linear polyethylene of melt index 3 such that the dry blend contained 30 weight percent glass. The material was processed in the extruder described in Example 16 to incorporate the glass fiber as filaments in the polymer melt. The extruder was operated at 30 r.p.m. screw speed, a melt temperature of 235° C. and a melt pressure of 175 p.s.i. at the die. The extrudate strand was lightly quenched with water and cut in uniform molding pellets. Samples of the product were fed to an injection molding machine to produce test bars. The test bars had the following properties:

Tensile strength—8,630 p.s.i.
Flex strength—11,400 p.s.i.
Izod impact—3.5 ft. lb./in.
Elongation—7.0%.
Flex modulus—590,000 p.s.i.
Heat distortion temp. at 264 p.s.i.—114° C.

EXAMPLE 25

Solid glass beads were heated, then cooled and 30 grams of them were warmed in an aqueous 1% solution of gamma-aminopropyltriethoxysilane. The glass was removed from the solution and dried in hot air before being placed in 100 cc. of a carbon tetrachloride solution containing 2 grams of ethylenemethacrylyl chloride polymer made from an ethylene-methacrylic acid copolymer which had 5.2 weight percent methacrylic acid groups. The coated glass with the reacted polymer on it was dried. Pressings were made using 15 grams of this coated glass with 1.5 grams of an ethylene-methacrylic acid polymer containing 10.3 weight percent methacrylic acid groups and having a melt index of 1500.

I claim:
1. A composite comprising high molecular weight hydrocarbon polymer intimately bonded to a silicic substrate through a copolymer containing at least 50 mole percent polymerized ethylene units and at least 0.1 mole percent polymerized units having the formula

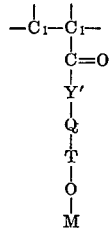

where $C_1$ is a carbon atom in the main copolymer chain, Y' is a divalent radical selected from the class consisting of —O— and

Q is a divalent radical having 1 to 22 carbon atoms that is bonded through carbon atoms to both Y' and T, T is a silicon containing radical selected from the class consisting of

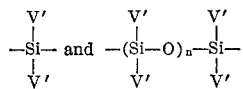

where $n$ is 1 to 28, V' is selected from the class consisting of —OR, —SR, and R, R is a radical selected from the class consisting of hydrogen and hydrocarbon containing radicals containing 1 to 22 carbon atoms and M is an atom in the silicic substrate and in which the silicon containing radicals are crosslinked through an

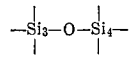

linkage where $Si_3$ and $Si_4$ are in different T radicals to form a network.

2. The composite of claim 1 in which the substrate is glass fiber and the hydrocarbon polymer is a polyolefin.
3. The composite of claim 2 in which the coated glass fiber comprises between about 1 and about 60 percent by weight of the composite.
4. The composite of claim 3 in the form of a molding granule.
5. The composite of claim 2 in which the copolymer coating on the glass fibers is 0.01 to 3% by weight of the coated glass fiber.
6. The composite of claim 5 in which the coated glass fiber is present in the amount of 1 to 60% by weight of the composite.
7. The composite of claim 1 in which the hydrocarbon polymer is selected from the class consisting of polyethylene, polypropylene, and ionic hydrocarbon polymer.
8. The composite of claim 7 in which the substrate is glass fiber.
9. The composite of claim 8 in the form of a molding granule.

References Cited

UNITED STATES PATENTS

| | | | |
|---|---|---|---|
| 3,249,461 | 5/1966 | Te Grotenhuis | 117—126 X |
| 3,252,825 | 5/1966 | Marzocchi et al. | 117—126 |
| 3,427,187 | 2/1969 | Wiggill | 117—118 |

WILLIAM D. MARTIN, Primary Examiner

D. COHEN, Assistant Examiner

U.S. Cl. X.R.

117—75, 76, 100, 118, 124, 126